UNITED STATES PATENT OFFICE.

CARLETON ELLIS, OF NEW YORK, N. Y., ASSIGNOR TO CHADELOID CHEMICAL COMPANY, OF NEW YORK, N. Y., A CORPORATION OF WEST VIRGINIA.

NON-INFLAMMABLE PAINT AND VARNISH REMOVER.

No. 817,141.     Specification of Letters Patent.     Patented April 3, 1906.

Original application filed February 10, 1902, Serial No. 93,468. Divided and this application filed December 2, 1904. Serial No. 235,205.

*To all whom it may concern:*

Be it known that I, CARLETON ELLIS, a citizen of the United States, residing at New York city, in the county of New York and State of New York, have invented certain new and useful Improvements in Non-Inflammable Paint and Varnish Removers, of which the following is a specification.

This invention relates to non-inflammable paint and varnish removers; and it consists in a non-inflammable paint and varnish removing composition, all as more fully hereinafter set forth, matters of novelty being particularly pointed out in the appended claims.

Paint-removers consisting of a mixture of volatile solvents capable of dissolving the various paints and varnishes admixed with evaporation-retarding thickeners, such as wax, have replaced the former phenol mixtures and the caustic-soda compositions in the market, being non-caustic and better adapted to the intended purpose; but as customarily made they have the disadvantage of being inflammable, most of the volatile solvents well adapted to dissolving paint or varnish—such as alcohol, acetone, &c.—igniting readily from a flame, such as that of a match. In the present invention I have sought to overcome this difficulty, making a composition which is substantially uninflammable on contact with flame. For this purpose I use in a specific way in the admixture certain proportions of halogenated organic substances, such as carbon tetrachlorid or allied bodies. Carbon tetrachlorid is a liquid having a boiling-point of about 76° centigrade and a comparatively high vapor tension. It is uninflammable. It is a solvent for many oils and resins used in paints and varnishes and is miscible with alcohol, acetone, &c. While it does not of itself ordinarily dissolve shellac, I have discovered that in admixture with such shellac solvents as alcohol it acquires that power. As frequently occurs in such cases, the mixture of solvents has different properties in respect to solvent power from that of its components. By reason of its comparatively high vapor tension and the high specific gravity of its vapor (about five times that of air) on standing at ordinary temperatures, as in a can or bottle, it becomes covered with an atmosphere of its own vapor not readily mixing with air, and of course uninflammable. I have discovered that by mixing it in proper proportions with certain other and inflammable solvents in such paint-removing compositions the ignitibility of the latter may be suppressed for all practical purposes, making compositions which, while equally efficient as paint-removers compared with the compositions of the prior art, have great practical advantages. By reason of its great vapor tension carbon tetrachlorid tends to evaporate before less vaporizable bodies, like grain-alcohol, its speed of evaporation, in fact, being about twice that of alcohol, and to form an atmosphere of its own vapor over bodies of paint-remover in which it forms a part, and such atmosphere being denser than that of most other volatile solvents in admixture with their vapors tends to restrain diffusion with air, and consequent ignitibility—that is, for example, alcohol-vapor being only a little over once and a half times as heavy as air tends to mix with it more readily than when admixed with a heavier vapor like that of the tetrachlorid. Both these effects—that of the superior vapor tension or evaporative tendency and that of its high vapor density—coöperate toward restraining the inflammability of mixtures of which it is a part.

My present invention consists in the combination, in paint-removers, with halogenated organic bodies, such as carbon tetrachlorid and allied substances, of such solvents as have a vapor tension not greater than its own, as grain-alcohol, ketones, aldehydes, &c., in such proportion that the evaporative tendency of the former predominate, whereby I produce compositions which at ordinary temperatures emit substantially uninflammable or non-ignitible vapors, the carbon tetrachlorid, so to speak, dominating the other vapors. Together with this mixture I combine a waxy evaporation-retarder or thickener, using any of the ordinary waxes—such as beeswax, ceresin, paraffin, &c.—producing a paint-remover of the general characters of the benzol methyl alcohol composition described and claimed in my former patent, No. 714,880, December 2, 1902, but distinguished therefrom by its uninflammable character and also in specific composition. In compositions of this type the wax is usually dissolved in a solvent thereof and the solution added to another varnish solvent in which the wax is insoluble and by which it is thrown down in a finely-divided or gelatinous form, and the quantity is sometimes as high as a third or more of the total mixture. For my present purposes, however, I prefer to use much less wax, since I find that an excessive amount acts injuriously on the uninflammable qualities. This is probably because being soluble in the carbon tetrachlorid and having, therefore, a sort of quasichemical affinity for it it tends to hold it back selectively from evaporation, more or less, to gelatinize with it. In other words, with too much wax the vaporization of the tetrachlorid is more interfered with than that of the other volatile solvents, such as alcohol, which do not have any such affinity for wax. As the specific wax used I prefer ceresin. In compositions made according to my present invention I have therefore made a radical change in the proportions of wax as compared with the prior art.

It will of course be understood that by varying the relative amount of uninflammable and inflammable constituents of my non-inflammable paint and varnish removers I am able to modify the flash-point, or the point at which the vapors ignite, to any desired degree. Modifications in the wax have the same effect to some extent.

A satisfactory composition for removing paint and varnish may be obtained by dissolving two parts of wax in fifteen parts of carbon tetrachlorid and mixing with the solution ten parts of grain-alcohol and one part of amyl acetate. The wax in this mixture forms about eight per cent. of the total.

The admixture of inflammable solvents possessing much greater vapor tensions or evaporative tendency than carbon tetrachlorid is not entirely precluded where these solvents are desirable for specific purposes, provided the added quantity of such body— as, for instance, acetone, benzin, (i. e., light petroleum naphtha,) or wood-alcohol—is insufficient to bring its vapors into predominance. A modicum of any of the bodies named may be incorporated into the composition stated above. A composition of this nature may be produced by dissolving two parts of wax in fourteen parts of carbon tetrachlorid and two parts of benzin and adding eight parts of grain-alcohol and two parts of wood-alcohol.

I am the first, so far as I am aware, to produce an uninflammable composition of the modern type of paint-removers—i. e., those containing wax and volatile solvents—in which inflammability is suppressed or removed by the addition of non-inflammable solvents of high vapor tension to inflammable solvents of lower vapor tension.

What I claim is—

1. An uninflammable paint-remover comprising a waxy body and an uninflammable mixture of volatile organic solvents.

2. An uninflammable paint-remover comprising a waxy body and a mixture of an uninflammable volatile solvent with inflammable volatile solvents of such nature and in such proportions as to give a predominant evaporative tendency to the former solvent.

3. An uninflammable paint-remover comprising a waxy body and a mixture of an uninflammable volatile solvent with other volatile solvents of not greater vapor tension.

4. An uninflammable paint-remover comprising a waxy body and a mixture of an uninflammable volatile solvent with other volatile solvents of less vapor tension.

5. An uninflammable paint-remover comprising a waxy body and a mixture of an uninflammable volatile solvent with a volatile solvent of approximately half its vapor tension.

6. An uninflammable paint-remover comprising not to exceed eight per cent. of a waxy body; an uninflammable volatile solvent and other solvents of such nature and in such proportions as to give a dominating evaporative tendency to the former solvent.

7. An uninflammable paint-remover, comprising not to exceed eight per cent. of a waxy body; carbon tetrachlorid in such proportions as to give a dominating vapor tension, and other solvents.

8. An uninflammable paint-remover comprising not to exceed eight per cent. of a waxy body; carbon tetrachlorid and grain-alcohol.

9. An uninflammable paint-remover comprising not to exceed eight per cent. of a waxy body, carbon tetrachlorid, grain-alcohol and amyl acetate.

10. An uninflammable paint-remover comprising two parts of a waxy body, fifteen parts of carbon tetrachlorid, ten parts grain-alcohol, and one part amyl acetate.

In testimony whereof I affix my signature in presence of two witnesses.

CARLETON ELLIS.

Witnesses:
 WARREN E. DIXON,
 A. M. SENIOR.